FILTER SYSTEM FOR CONTROL OF OUTGAS CONTAMINATION IN VACUUM

Filed Nov. 8, 1968 2 Sheets-Sheet 1

INVENTOR
BOBBY W. KENNEDY

BY [signature] [signature]
ATTORNEYS

INVENTOR
BOBBY W. KENNEDY
BY
Joseph H Beumer
ATTORNEYS

United States Patent Office 3,557,534

Patented Jan. 26, 1971

3,557,534

FILTER SYSTEM FOR CONTROL OF OUTGAS CONTAMINATION IN VACUUM

Bobby W. Kennedy, Arab, Ala., assignor to the United States of America as represented by the Administrator of the National Aeronautics and Space Administration Filed Nov. 8, 1968, Ser. No. 774,266

Int. Cl. B01d *53/04*

U.S. Cl. 55—75 6 Claims

ABSTRACT OF THE DISCLOSURE

A filter system for control of outgas contamination of equipment assemblies in the space environment. Components subject to outgassing are enclosed in a sealed container vented externally through a filter having absorbent beds of a molecular sieve zeolite, silica gel and charcoal. Contamination of exposed optical surfaces with deposits derived from outgas fragments is prevented by this means.

ORIGIN OF THE INVENTION

The invention described herein was made by an employee of the United States Government and may be manufactured and used by or for the Government of the United States for governmental purposes without payment of any royalties thereon or therefor.

BACKGROUND OF THE INVENTION

This invention relates to control of outgas contamination in vacuum and more particularly to a filter system for collecting and holding outgas contaminants in equipment assemblies for use in the space environment.

One of the problems encountered in the operation of optical equipment and other devices such as solar cell electrical panels in the space environment is outgas contamination of exposed surfaces. Under the high vacuum and extreme temperature conditions existing in outer space, nonmetallic components such as polymeric insulation, conformal coatings and potting compounds for electronic assemblies are subject to outgassing of adsorbed gases and decomposition products. The evolved gases normally include adsorbed air and water vapor, along with polymer-derived hydrocarbon molecular species of varying composition. Release of the evolved gases to the outside of the spacecraft body does not remove them from vicinity; instead, they orbit the spacecraft and stay with it, apparently due to gravitational forces similar to the forces holding the atmosphere around the earth. The circulating gases produce a solid deposit on exposed surfaces through various mechanisms including condensation and freezing of water vapor and repolymerization of hydrocarbon molecular species under the influence of the intense ultraviolet radiation of outer space. It may be readily seen that the resulting solid coating seriously interferes with or produces distortion in the transmission of images through lenses in telescopes, cameras and the like. The efficiency of solar cells and thermal control coatings is also reduced.

Outgassing of nonmetallic materials has required extensive testing and careful selection of materials to minimize this effect. Such measures, however, do not provide positive assurance that no outgassing will occur, and an effective means of collecting and preventing the circulation of outgas fragments is needed.

SUMMARY OF THE INVENTION

In the present invention nonmetallic components subject to vacuum outgassing are enclosed in sealed, vented containers, each of the containers being vented through a filter containing selected absorbents for gaseous fragments over a broad spectrum of molecular sizes. A suitable combination of absorbents for this purpose includes activated charcoal, silica gel and a molecular sieve absorbent. Circulation and deposition of gaseous fragment on exposed surfaces is prevented by this means. For evacuated spacecraft which house optical equipment such as telescopes and cameras along with electronic equipment requiring nonmetallic components, the latter components are mounted in one or more sealed black boxes vented as described above. The time and expense involved in selecting and testing materials for nonmetallic component use are substantially reduced, and a more positive assurance is given that such components will not serve as a source of surface contamination.

It is therefore an object of this invention to prevent circulation and deposition of gaseous fragments produced by vacuum outgassing of nonmetallic materials.

Another object is to provide a filter system for collection and retention of vacuum outgassing products evolved from electronic assemblies in orbiting space vehicles.

Other objects and advantages of the invention will be apparent from the following detailed description and claims.

DESCRIPTION OF THE PREFERRED EMBODIMENT

Figure 1:
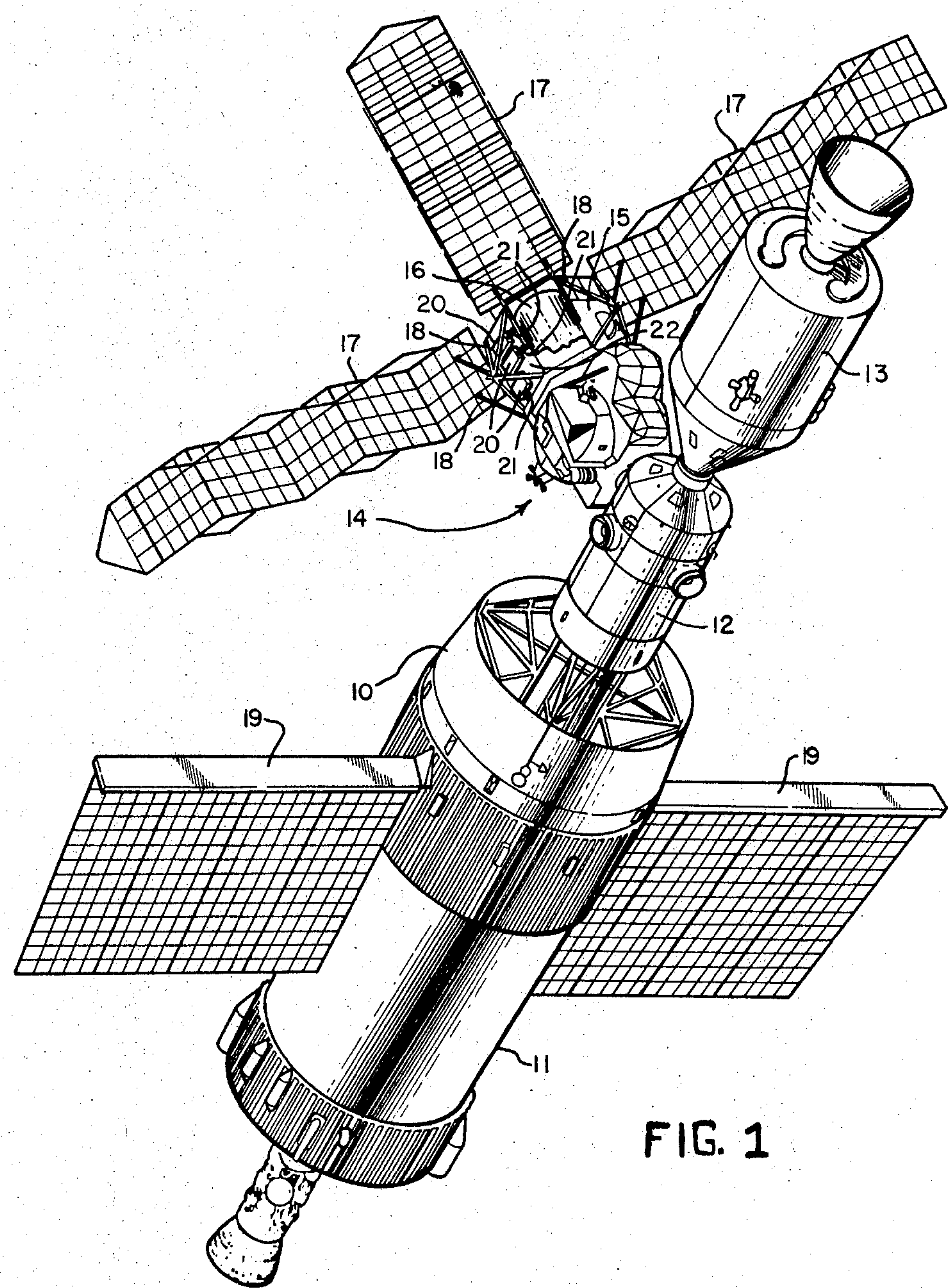
FIG. 1 is a perspective view, partially broken away, showing an orbital space vehicle having electronic assemblies provided with filter systems embodying the invention.

Referring to FIG. 1 in the drawings, there is depicted an orbital space vehicle designated generally by the numeral 10. The orbital vehicle includes a workshop stage 11, produced by modification of the upper stage of a launch vehicle, a docking adapter 12 attached to the upper end thereof, a manned spacecraft 13 mating with adapter 12, a lunar excursion module 14, also attached to adapter 12, a telescope mount structure 15 connected to module 14 and a telescope 16 carried inside mount structure 15 and extending outward therefrom so that the telescope lens (not shown) has its outer surface exposed. Solar cell panel arrays 17 supported by a plurality of braces 18 extend outward in three directions from mount structure 15. Workshop stage 11 also has two large solar cell panels 19 extending outward. Electronic components are disposed in housings or black boxes 20 vented through filters 21, the housings being mounted on a frame 22 in mount structure 15. In addition to telescope 16, numerous other devices and instruments (not shown) are provided for gathering and transmission of scientific data and related purposes.

Figure 2:
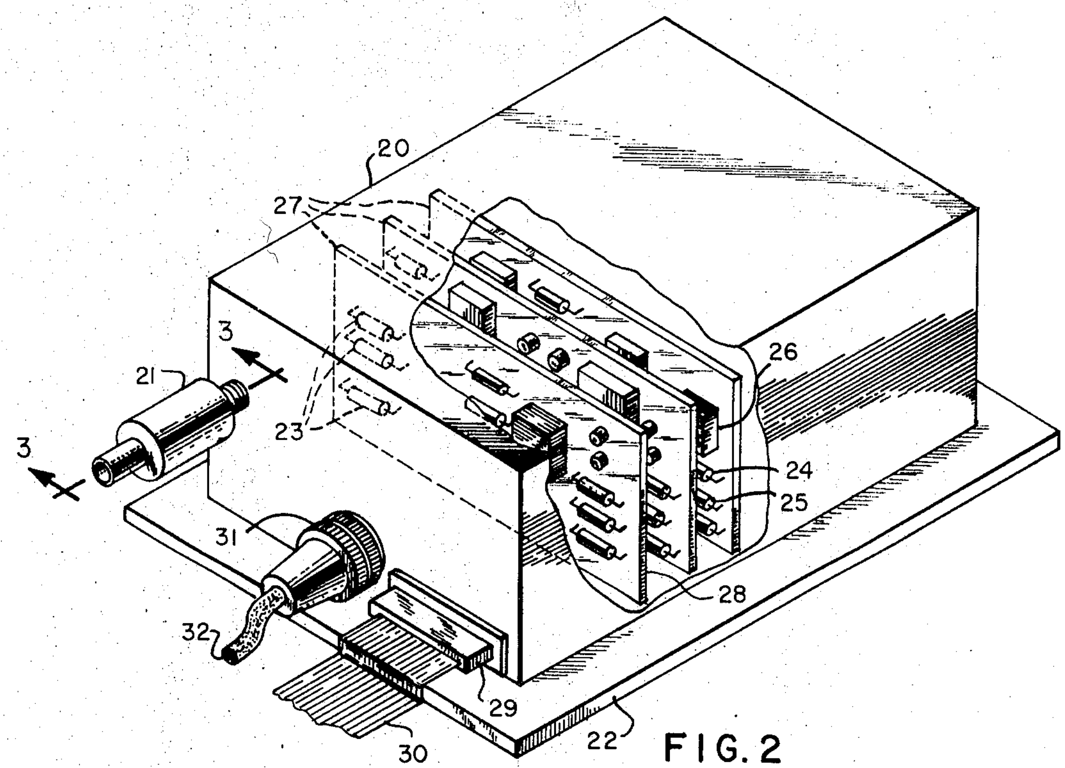
FIG. 2 is an isometric view of the sealed electronic assembly housing and filter.

FIG. 2 shows housing 20 vented through filter 21 and mounted on frame member 22. Numerous electronic components including capacitors 23, resistors 24, diodes 25 and solid potted electronic modules 26 are disposed on panels 27 within the housing. The panels are covered with a polymeric conformal coating 28. Receptacle 29 provides access for flat electrical cable 30 and receptacle 31 for a conventional electrical cable 32.

Figure 3:
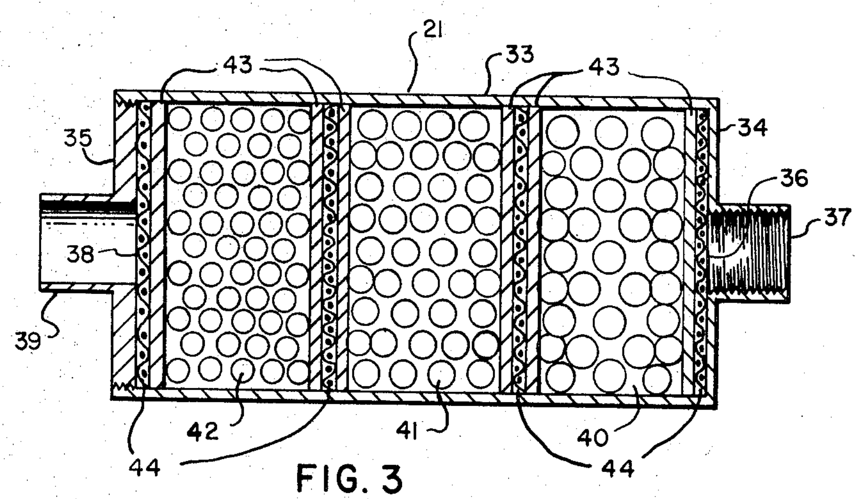
FIG. 3 is a sectional view of the filter, taken along line 3—3 in FIG. 2.

The detailed structure of filter 21 is shown in FIG. 3. The filter is encased by tubular metal housing 33 and end walls 34 and 35. End wall 34 has a central opening 36 communicating with the interior of housing 20 and an integral, outwardly extending collar 37 threaded on the inside for attachment to mating sleeve (not shown)

mounted on housing 20. Opposite end wall 35 has a central outlet port 38 extending therethrough and an outwardly extending integral collar 39. Inside the filter absorbent beds 40, 41 and 42 are disposed in radially extending layers. Absorbent bed 40 at the end nearest housing 20 is made up of particles of activated charcoal, intermediate bed 41, silica gel and bed 42 adjacent the outlet port, a molecular sieve zeolite. A sheet of filter paper 43 is disposed across the face of the filter on both sides of each absorbent bed, and a supporting metal wire screen 44 is provided between the beds and across each end of the filter.

The combination of absorbents employed in the filter is effective in collecting and retaining gaseous fragments over the entire spectrum produced by desorption or decomposition of nonmetallic materials in vacuum. Charcoal and silica gel are effective for absorption of organic decomposition products and water vapor, respectively, and the zeolite absorbent is effective for any species which escape through the preceding absorbent beds. The sheets of filter paper in the filter assembly also serve to absorb certain species such as organic oils and plasticizers of their decomposition products. Although evolved gaseous fragments are effectively absorbed and retained as indicated above, a minute but insignificant portion thereof may pass completely through the filter and escape to the exterior of the spacecraft.

The molecular sieve zeolite absorbent can be any zeolite, which term encompasses a group of hydrated silicates of either sodium or calcium, or both. Examples of suitable zeolites include the naturally occurring materials chabazite $CaAl_2Si_4O_{12} \cdot 6H_2O$, heulandite $CaAl_2Si_6O_{16} \cdot 5H_2O$, stilbite $CaAl_2Si_6O_{16} \cdot 6H_2O$, thompsonite $(CaNa_2)Al_2Si_2O_8 \cdot 2H_2O$, natrolite $Na_2Al_2Si_3O_{10} \cdot 2H_2O$ and analcite $$NaAlSi_2O_6 \cdot H_2O$$

Synthetic zeolites can also be used. The silica gel and charcoal absorbents can be any activated form of these materials, both of which are readily available in such form. "Millipore" type filter paper is suitable for the filter sheets on each side of the beds, and bilbous type absorbent paper can also be used.

The absorbents are disposed in particle beds across the path of evolving gases. For best results the absorbent particles in each of the beds should be within the range of 30 to 300 microns in diameter, although other sizes can be used. The amount of absorbent in the beds and the dimensions can be varied, depending on the extent of outgassing expected. In the embodiment described above, the charcoal absorbent is located adjacent the outgas input, the silica gel bed in an intermediate position and the molecular sieve bed adjacent the vacuum port. However, the respective beds can be arranged in a different order or additional beds can be provided if desired.

In actual tests employing a filter constructed as described above, materials with high outgassing rates were placed in vacuum in a sealed "black box" vented through the filter. A mass spectrometer was positioned to detect any gas fragments which passed through the filter. The filter absorbed and retained all outgas fragments, as indicated by a lack of any peaks in the spectrometer reading. In the absence of the filter numerous high peaks up to 250 atomic mass units was observed.

It is to be understood that various changes and modifications to the embodiments described above will be apparent to those skilled in the art to which the invention pertains. For example, additional absorbents such as calcium chloride, activated alumina or calcuim metasilicate can be provided in the filter if desired. Such changes and modifications are deemed to be included within the spirit and scope of the invention, which is limited only as indicated by the appended claims.

What is claimed is:

1. In combination a spacecraft assembly including components having exposed external surfaces degradable by deposition of a coating thereon and at least one enclosure containing electronic equipment and polymeric materials subject to vacuum outgassing and deposition of the products thereof as a coating on said surfaces, a vent for said enclosure defining a flow path for egress of gases evolved by said polymeric material and a filter disposed in said vent across said flow path, said filter containing absorbents capable of absorbing and retaining said gases.

2. The invention of claim 1 wherein said absorbents include a molecular sieve zeolite, silica gel and charcoal.

3. The invention of claim 2 wherein said absorbents are arranged in a series of separated particle beds, the bed adjacent the inlet of said filter containing said charcoal, the intermediate bed containing said silica gel, and the bed adjacent the outlet of said filter containing said molecular sieve zeolite.

4. The invention of claim 3 including at least one sheet of filter paper disposed across the face of said filter adjacent the filter outlet and inlet and between each of said beds.

5. The invention of claim 4 wherein the particle size of said absorbents in said beds is from 30 to 300 microns in diameter.

6. The method of preventing the formation of a coating on exposed surfaces of an orbital spacecraft assembly including electronic equipment and polymeric material associated therewith which is subject to vacuum outgassing which comprises enclosing said eletronic equipment and associated polymeric material within one or more containers each of said containers having a vent defining a flow path for evolving gases and a filter disposed across said flow path and adapted to absorb said gases, said filter including particle beds of activated charcoal, silica gel and a molecular sieve zeolite, and absorbing coating-forming particles in said filter.

References Cited

UNITED STATES PATENTS

| | | | |
|---|---|---|---|
| 2,593,132 | 4/1952 | Gannon | 55—387 |
| 2,881,854 | 4/1959 | Uehre, Jr. | 55—316 |
| 2,992,703 | 7/1961 | Vasan et al. | 55—75X |
| 3,116,764 | 1/1964 | Jepsen et al. | 55—387UX |
| 3,221,477 | 12/1965 | Arnoldi et al. | 55—75X |

JOHN ADEE, Primary Examiner

U.S. Cl. X.R.

55—35, 316, 389